US012517881B2

(12) United States Patent
Willett et al.

(10) Patent No.: US 12,517,881 B2
(45) Date of Patent: Jan. 6, 2026

(54) GENERATING A DETUNED DECISION TREE FOR ENTITY SELECTION

(71) Applicant: Charter Communications Operating, LLC, St. Louis, MO (US)

(72) Inventors: Virginia Grace Willett, Lone Tree, CO (US); Duncan W. Gold, Denver, CO (US); Gary Steven Fidler, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 18/630,607

(22) Filed: Apr. 9, 2024

(65) Prior Publication Data

US 2025/0315421 A1    Oct. 9, 2025

(51) Int. Cl.
*G06F 16/22*     (2019.01)
*G06F 16/2455*   (2019.01)

(52) U.S. Cl.
CPC ...... *G06F 16/2246* (2019.01); *G06F 16/2455* (2019.01)

(58) Field of Classification Search
CPC .................. G06F 16/2246; G06F 16/2455
See application file for complete search history.

(56) References Cited

U.S. PATENT DOCUMENTS

| | | | |
|---|---|---|---|
| 8,533,129 B2* | 9/2013 | Kejariwal | G06N 5/01 706/12 |
| 11,055,737 B1* | 7/2021 | Dakic | G16H 50/20 |
| 11,983,228 B1* | 5/2024 | Swope | G06F 16/951 |
| 2017/0011420 A1* | 1/2017 | Sullivan | G06Q 30/0277 |
| 2018/0040011 A1* | 2/2018 | Milton | H04W 4/029 |
| 2019/0318421 A1* | 10/2019 | Lyonnet | G06N 20/20 |
| 2020/0065396 A1* | 2/2020 | Ozcaglar | G06F 16/9027 |
| 2020/0193332 A1* | 6/2020 | Zhang | G06F 16/2246 |
| 2020/0349161 A1* | 11/2020 | Siddiqui | G06N 20/10 |
| 2022/0230203 A1* | 7/2022 | Liu | G06F 18/24323 |
| 2023/0370490 A1* | 11/2023 | Crabtree | H04L 63/1433 |
| 2024/0144319 A1* | 5/2024 | Saidi | G06Q 30/0254 |
| 2025/0139958 A1* | 5/2025 | Wang | G06V 10/751 |
| 2025/0254031 A1* | 8/2025 | Tajima | G06F 16/2246 |

\* cited by examiner

*Primary Examiner* — Merilyn P Nguyen
(74) *Attorney, Agent, or Firm* — Dority & Manning, P.A.

(57) ABSTRACT

A subset of trainable features from a set of features is selected based at least in part on feature metadata. A trained decision tree is generated to predict which entities of a plurality of entities have a target feature. A corresponding quantity of entities of the plurality of entities that do not have the target feature is determined for each leaf node in the trained decision tree. A subset of the plurality of leaf nodes are selected wherein each leaf node in the subset of leaf nodes has a corresponding quantity of entities in between a minimum threshold quantity and a maximum threshold quantity. An aggregate quantity of entities is determined based on a sum of the corresponding quantity of entities of each leaf node in the subset of leaf nodes. The process is repeated until a suitable trained decision tree is generated.

20 Claims, 5 Drawing Sheets

GENERATING A DETUNED DECISION TREE FOR ENTITY SELECTION

BACKGROUND

A decision tree is a supervised machine learning approach which produces a tree-like predictive model to draw conclusions about a set of observations.

SUMMARY

Disclosed herein are mechanisms for generating a detuned decision tree for entity selection based on a size of a desired target audience of entities.

In one implementation a method is provided. The method includes selecting a subset of trainable features from a set of features based at least in part on feature metadata corresponding to the set of features. The method further includes generating, by the computing system using the subset of trainable features and a training dataset, a trained decision tree to predict which entities of a plurality of entities have a target feature. The method includes determining, for each leaf node of the trained decision tree, a corresponding quantity of entities of the plurality of entities that do not have the target feature. The method includes selecting a subset of the plurality of leaf nodes wherein each leaf node in the subset of leaf nodes has a corresponding quantity of entities in between a minimum threshold quantity and a maximum threshold quantity. The method includes determining, by the computing system, an aggregate quantity of entities based on a sum of the corresponding quantity of entities of each leaf node in the subset of leaf nodes. The method includes determining, by the computing system, that the decision tree is a suitable trained decision tree where the aggregate quantity of entities of the trained decision tree is between a minimum target audience quantity and a maximum target audience quantity.

In another implementation a computing system is provided. The computing system includes one or more computing devices operable to select a subset of trainable features from a set of features based at least in part on feature metadata corresponding to the set of features. The one or more computing devices are further operable to generate, using the subset of trainable features and a training dataset, a trained decision tree to predict which entities of a plurality of entities have a target feature. The one or more computing devices are further operable to determine, for each leaf node of the trained decision tree, a corresponding quantity of entities of the plurality of entities that do not have the target feature. The one or more computing devices are further operable to select a subset of the plurality of leaf nodes wherein each leaf node in the subset of leaf nodes has a corresponding quantity of entities in between a minimum threshold quantity and a maximum threshold quantity. The one or more computing devices are further operable to determine an aggregate quantity of entities based on a sum of the corresponding quantity of entities of each leaf node in the subset of leaf nodes. The one or more computing devices are further operable to determine that the decision tree is a suitable trained decision tree where the aggregate quantity of entities of the trained decision tree is between a minimum target audience quantity and a maximum target audience quantity.

In another implementation a non-transitory computer-readable storage medium is provided. The non-transitory computer-readable storage medium includes executable instructions operable to cause one or more computing devices to select a subset of trainable features from a set of features based at least in part on feature metadata corresponding to the set of features. The instructions are further operable to cause the one or more computing devices to generate, using the subset of trainable features and a training dataset, a trained decision tree to predict which entities of a plurality of entities have a target feature. The instructions are further operable to cause the one or more computing devices to determine, for each leaf node of the trained decision tree, a corresponding quantity of entities of the plurality of entities that do not have the target feature. The instructions are further operable to cause the one or more computing devices to select a subset of the plurality of leaf nodes wherein each leaf node in the subset of leaf nodes has a corresponding quantity of entities in between a minimum threshold quantity and a maximum threshold quantity. The instructions are further operable to cause the one or more computing devices to determine an aggregate quantity of entities based on a sum of the corresponding quantity of entities of each leaf node in the subset of leaf nodes. The instructions are further operable to cause the one or more computing devices to determine that the decision tree is a suitable trained decision tree where the aggregate quantity of entities of the trained decision tree is between a minimum target audience quantity and a maximum target audience quantity.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
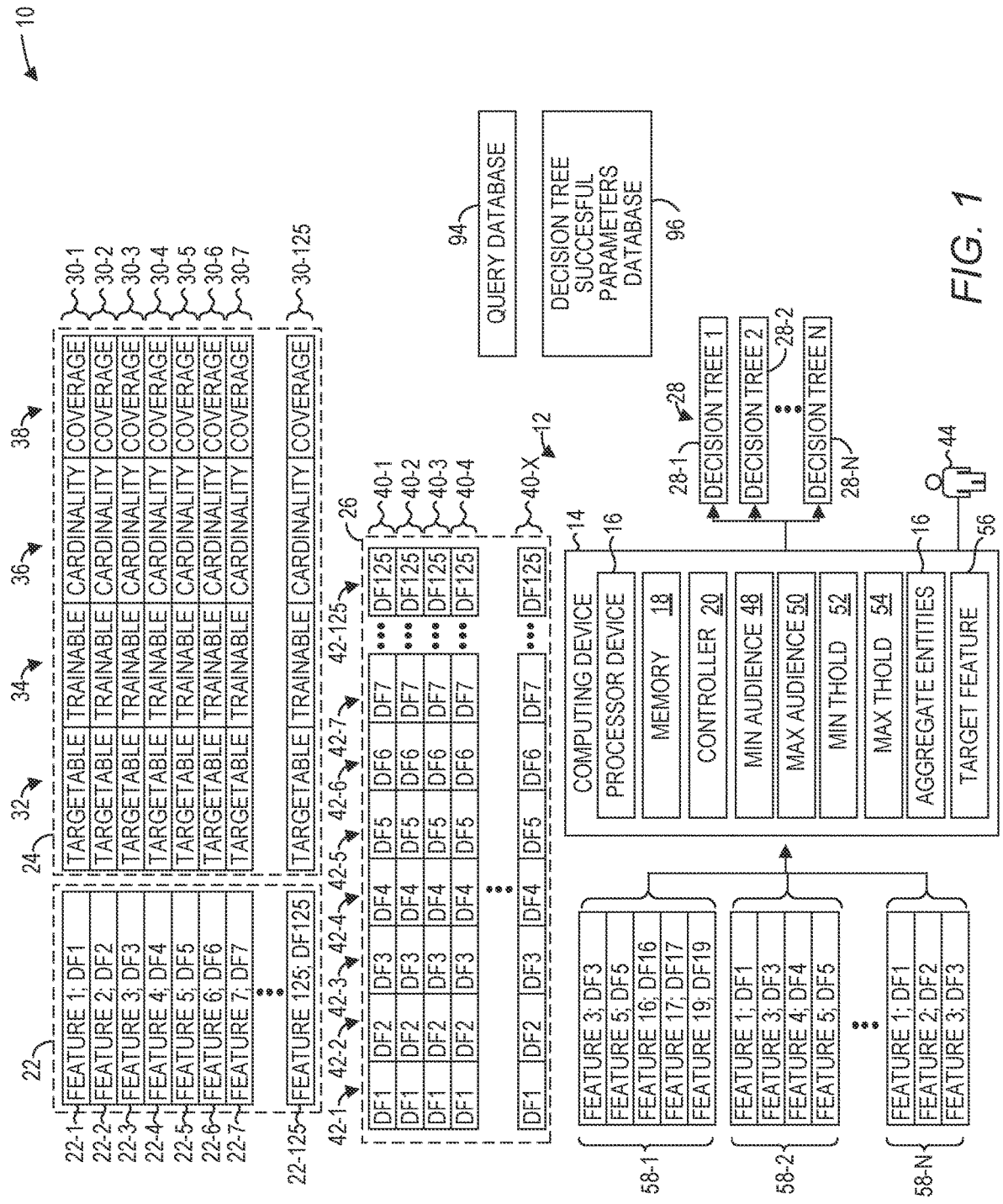
FIG. 1 is a block diagram of an environment suitable for generating a detuned decision tree for entity selection according to some implementations.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples and claims are not limited to any particular sequence or order of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

In machine learning, a feature is an individual measurable property or characteristic of a phenomenon. A feature value can be categorical (discrete) or numerical (continuous). A decision tree is a supervised machine learning approach that produces a tree-like predictive model to draw conclusions about a set of features. A decision tree is trained using certain features, referred to herein as training or trainable features, to predict a particular feature, referred to herein as a target or targetable feature. Both training features and the target feature have values. A decision tree can predict using a discrete set of values for its target feature value (e.g., a classification tree) or a continuous value (e.g., a regression tree).

Features differ depending on the particular thing that is to be predicted. In the context of predicting whether a future date may be appropriate to play golf, features may include, for example, predicted precipitation, predicted wind speed, predicted temperature, location of the golf course, and the like. In the context of a service provider that provides Internet service, television service, cellular service, or the like, features associated with subscribers (e.g., entities) may include an income band, age band, location information (zipcode, DMAs), marital/family information (married? Children? How many children?), hobbies (e.g., fishing, hiking, sewing, video games, sports lover), currently subscribed offerings (e.g., HBO? a sports package?), voting information, propensity for buying a certain style of vehicles (e.g., sedan, SUV, motorcycle), type of devices they currently use (mobile phone?, type of mobile phone?).

There can be hundreds of different features that may potentially be useful in generating a decision tree, and determining which particular subset of those features results in the most suitable decision tree can be difficult and time-consuming. Moreover, some features may be better suited for training than others. For example, a feature that is unique to each training entity, such as a serial number or social security number, is arbitrary and not a useful feature for training. It would be desirable to ensure that such features are not used for training purposes.

Moreover, in some situations, a highly accurate decision tree may not be an ideal decision tree for a particular application. As an example, while a decision tree may be able to be trained to accurately identify those entities that are likely to be interested in a particular offering, it may be desirable to offer not only those entities the offering, but other entities that do not fit the exact criteria identified by the decision tree.

One mechanism to ensure that a decision tree is not "overfitted" is to undergo a "pruning" process. Various hyperparameters may be altered to attempt to control either overfitting or underfitting of a decision tree. Examples of such hyperparameters are:

Tree Depth—The maximum depth of the tree. This is defined by the longest path between the root node of a decision tree and its farthest-pathing leaf node;

Minimum Samples per Node—The number of minimum sample data points required to split an internal node (switching it from a leaf node with a decision, into a node with a split);

Minimum Samples per Leaf—The number of minimum sample data points required for a leaf node to be constructed (leaf nodes carry decisions);

Cost Complexity Pruning Hyperparameters—Also known as Weakest Link Pruning, these are hyperparameters used for forming well-balanced trees; and Number of Estimators—used in Ada Boost, a number of estimators before a ML algorithm terminates.

However, there are several shortcomings of such mechanisms. The common post-pruning algorithms available for mitigating an overfitted tree can be insensitive to a feature's uniqueness. Chi-Square is used for a stochastic independence test when pruning a tree, but Chi-Square lacks the context of a feature's footprint or the range of values represented in its dataset. Since not all features and their values are represented equally, the pruning algorithm requires additional information to adequately broaden its node's criteria.

Moreover, when a decision tree is typically translated into a ruleset equivalent, the ruleset equivalent usually captures an exact representation of the decision tree. In a situation where the decision tree is trained to identify entities, such as subscribers, who may be interested in an additional service or product, the ruleset falls short when attempting to identify those subscribers who do not currently own the target feature since there is no need to offer a service or product to a subscriber who already has the service or product.

Disclosed herein are mechanisms for generating a detuned decision tree for entity selection based on a size of a desired target audience of entities. The term "audience" as used herein refers to a plurality of entities. One or more trained decision trees may be generated based on subsets of trainable features selected from a plurality of features to predict a target feature, such as, by way of non-limiting example, a particular product or service. A minimum threshold quantity and a maximum threshold quantity are set for the leaf nodes. A minimum target audience quantity and a maximum target audience quantity is set. A subset of leaf nodes are selected, wherein each leaf node in the subset of leaf nodes has a quantity of entities within the minimum threshold quantity and a maximum threshold quantity. The quantity of entities of each leaf node in the subset of leaf nodes are summed to generate an aggregate quantity of entities. If the aggregate quantity of entities is not within the minimum threshold quantity and the maximum threshold quantity, the training process may repeat with a different set of trainable features. If the aggregate quantity of entities is within the minimum threshold quantity and the maximum threshold quantity, the training process may stop. A query may then be constructed from the trained decision tree based on the decision nodes in the paths between a root node of the decision tree and each leaf node in the subset of leaf nodes. The query may include a condition that omits entities that have the target feature. The query may be used to query a database of entities to identify a subset of the entities that match the query.

FIG. 1 is a block diagram of an environment 10 in which a detuned decision tree for entity selection can be generated according to some implementations. The term "entity" as used herein refers to the things or items from which a subset is to be selected based on a query generated from the trained decision tree. In the examples disclosed herein, the entities are subscribers of a service provider, but the examples are not limited to subscribers and can be any things or items, such as inanimate objects, or the like. The term "audience" as used herein refers to a collection of entities.

The environment 10 includes a computing system 12 that includes one or more computing devices 14. The computing device 14 incudes one or more processor devices 16 and a memory 18. The computing device 14 includes a controller 20 that will be described herein as implementing certain functionality, however, it is noted that while the functionality described herein may be attributed to a single component, such as the controller 20, in practice, the functionality may be implemented by any number of components. Such components may be implemented on a single computing device 14 of the computing system 12, or may be distributed across multiple computing devices 14 of the computing system 12. Moreover, because the controller 20 is a component of the computing system 12, functionality implemented by the controller 20 may be attributed to the computing system 12 generally.

As will be described in greater detail below, the controller 20 utilizes a plurality of features 22-1-22-125 (generally, features 22), feature metadata 24, hyperparameters, and a training dataset 26, to generate one or more decision trees 28 that predict which entities have a particular target feature. The controller 20 selects one or more decision trees 28 that meet certain criteria, in particular a decision tree 28 that is not overfitted but is also not underfitted, based on a desired target audience size. The controller 20 may then access a suitable decision tree 28 and generate a query based on the root node and decision nodes of the decision tree 28. The query can be used to query a database of entities to obtain a subset of entities that do not have the target feature, but that may benefit from having the target feature. Subsequent communications can be generated and communicated to such entities.

As discussed above, the features 22 are measurable properties or characteristics. The features 22 correspond to data fields in the training dataset 26. The value of a feature may be referred to herein as the feature value. A feature value can be categorical (discrete) or numerical (continuous). The features 22 may differ depending on the context in which the implementations disclosed herein are implemented. Solely for purposes of discussion, the context in which the implementation will be discussed is that of a national service provider that has millions of subscribers and that provides multiple services and products that may benefit such customers. In this context, the features 22 may comprise properties and characteristics of the subscribers. Thus, the term "entity" as used in this example, will refer to a subscriber.

Examples of features 22, in this context, may include, by way of non-limiting example, an income band, age band, location information (zipcode, DMAs), marital/family information (married? Children? How many children?), hobbies (e.g., fishing, hiking, sewing, video games, sports lover), currently subscribed offerings (e.g., HBO? a sports package?), voting information, propensity for buying a certain style of vehicles (e.g., sedan, SUV, motorcycle), type of devices they currently use (mobile phone?, type of mobile phone?), and the like. There may be hundreds or thousands of features 22.

The feature metadata 24 comprises a plurality of metadata entries 30-1-30-125 (generally, metadata entries 30) that correspond to ones of the plurality of features 22-1-22-125, respectively. Each metadata entry 30 can include a targetable feature field 32 that indicates whether the particular feature 22 to which the metadata entry 30 corresponds can be selected as a targetable feature. As an example, the metadata entry 30-1 corresponds to the feature 22-1, and the targetable feature field 32 may comprise a value, such as a binary 1, that indicates that the feature 22-1 can be a targetable feature. The metadata entry 30-2 corresponds to the feature 22-2, and the targetable feature field 32 may comprise a binary 0, that indicates that the feature 22-2 cannot be selected as a targetable feature. The values of the targetable feature field 32 may be set, for example, by an operator.

Examples of targetable features, by way of non-limiting example, in the context of the implementation described herein, are a particular bandwidth tier, a hobby, or a cellular product. A feature 22 that represents specific demographic data, for example, may be considered sensitive, and thus the targetable feature field 32 of the corresponding metadata entry 30 may be set to a value of 0 to prevent the feature 22 from being selected as a targetable feature.

Each metadata entry 30 can include a trainable feature field 34 that indicates whether the feature 22 to which the metadata entry 30 corresponds can be selected as a trainable feature. The trainable feature field 34 may comprise a value, such as a binary 1 or 0, to indicate whether the corresponding feature 22 is trainable or not, respectively. The trainable feature field 34 may be set by an operator. If a feature 22 is inherently known to result in bad decision tree leaves, the trainable feature field 34 of the corresponding metadata entry 30 can be set to a binary 0 so that the feature 22 cannot be used as a trainable feature. Potential non-trainable features 22 may be features 22 that are discovered to be a dependent variable of other independent features 22, features 22 that are inherently high cardinality, such as, by way of non-limiting example, account identifiers, equipment identifiers, or the like. Potential non-trainable features 22 may be features 22 that are informational and pose no strategic value (e.g., metadata about equipment used for operational purposes), and features 22 that contain personally identifiable information (PII), and features 22 that pose an ethical risk in including in the data (e.g., immutable characteristics from which no strategic value can be inferred).

Each metadata entry 30 can include a cardinality field 36 that, if not empty, identifies a quantity of or percentage of entities of the training dataset 26 that have a distinct value in a data field that corresponds to the feature 22 to which the metadata entry 30 corresponds. The cardinality field 36 for each metadata entry 30 may be calculated during a data ingestion process of the training data 26, as will be described in greater detail below. A cardinality value of 1 would indicate that the corresponding feature 22 may not be suitable for training purposes. A cardinality value of 2, such as where the value of the corresponding feature 22 can be one of two values, such as male or female, or above a threshold or below a threshold, may be very suitable for training purposes.

Each metadata entry 30 can include a feature coverage field 38 that identifies a quantity of or percentage of entities of the training dataset that have a value in a data field of the training dataset 26 that corresponds to the feature 22 to which the metadata entry 30 corresponds. The feature coverage field 38 for each metadata entry 30 may be calculated during the data ingestion process of the training data 26.

While illustrated as separate structures, in other implementations the features 22 and the metadata entries 30 can be combined in a single structure. As an example, in one implementation each feature 22 and the metadata entry 30 to which the feature 22 corresponds can be implemented in an entry or record having the following format:

Feature identifier (ID): type UUID
Feature name: type string
Feature type: [int, float, string, enum, enum_categorical, date]
datasource: type UUID (identifies field in the training dataset 26 to which this feature corresponds)
isTargetable: type Boolean
is Trainable: type Boolean
coverage: type double
cardinality: type int The training dataset 26 comprises a plurality of entries 40-1-40-X (generally, entries 40), each entry 40 corresponding to a real-world entity, which, in this example, is a subscriber. The training dataset 26 is typically a subset of a complete dataset containing entries for all or substantially all of the service provider's subscribers. The training dataset 26 may comprise any suitable subset of the complete dataset, such as 10%, 20%, or the like. The complete dataset may comprise millions of entries, and thus the training dataset 26 may also contain hundreds of thousands or millions of entries 40. Each entry 40 comprises a plurality of data fields 42-1-42-125, at least some of which correspond to ones of the plurality of features 22. For example, the feature 22-1 corresponds to the data field 42-1. The correspondence is that the value contained in the data field 42-1 is the feature value of the feature 22-1 for this particular entry 40. Because the feature 22-1 corresponds to one another, and the metadata entry 30-1 corresponds to the feature 22-1, it can be said that the feature 22-1, the metadata entry 30-1 and the date field 42-1 each correspond to one another. The training dataset 26 can be obtained, for example, from known or discovered information about the subscribers, or may be purchased from companies that offer known information about the subscribers.

With this background, an example of generating a detuned decision tree for entity selection will be discussed. An operator or user 44 may designate a number of hyperparameters 46, only some of which are illustrated in FIG. 1. The user 44 may designate the hyperparameters in conjunction with initiating the controller 20, and/or designate the hyperparameters 46 prior to initiating the controller 20, such as by defining the hyperparameters 46 in a configuration file, or the like. The hyperparameters in this example include a minimum target audience quantity 48 and a maximum target audience quantity 50. The minimum target audience quantity 48 and the maximum target audience quantity 50 are used, as will be described in greater detail below, to determine whether a particular decision tree 28 is a suitable decision tree 28. For purposes of illustration and simplicity, it will be assumed that the minimum target audience quantity 48 is set to a value of 10000 and the maximum target audience quantity 50 is set to a value of 15000, indicating a desire to obtain a decision tree 28 that contains conditions that, when converted to a ruleset, such as a query, will result in identifying 10,000-15,000 entities (e.g., subscribers), who do not have the target feature.

The hyperparameters also include a minimum threshold quantity 52 and a maximum threshold quantity 54. The minimum threshold quantity 52 and the maximum threshold quantity 54 define a window that is applied to each leaf node of a decision tree 28 to determine whether the entities that correspond to the leaf node should be included in calculating whether the decision tree 28 encompasses a quantity of entities in between the minimum target audience quantity 48 and the maximum target audience quantity 50. For purposes of illustration and simplicity, it will be assumed that the minimum threshold quantity 52 is set to a value of 4000 and the maximum threshold quantity 54 is set to a value of 8000.

Hyperparameters that may be defined include, but are not limited to:

Cost Complexity Pruning Alpha Adjustment (CCPA)—A relatively small number used for adjusting the CCP Alpha hyperparameter. A value of 0.00001 is a suggested default value.

Cost Complexity Pruning Alpha (CCP)—A standard decision tree hyperparameter for pruning uninteresting branches.

Leaf Window Adjustment—A predetermined relatively small value that can be applied to the minimum threshold quantity 52 and the maximum threshold quantity 54 in order to increase or decrease the found audience sizes.

Minimum Data Quality—This sets the minimum row quality that a record must have to be included as part of the sample. The row quality is determined from a weighted sum of all populated features for the row.

Minimum Entities Per Leaf—The minimum number of entities within any given leaf in the tree. This value can be used to prevent potential leaking of indirect PII via overly specific branches.

Minimum Entities Per Split—The minimum number of entities for any given node in the decision tree to be split into further subtrees. This value can be used to prevent potential leaking of indirect PII via overly specific branches.

Minimum target audience quantity 48 and the maximum target audience quantity 50—The minimum target audience quantity 48 and the maximum target audience quantity 50 that the decision tree 28 should target. In most cases, the user has an approximate idea of how large of audience is desirable, thus this value can be specified by the user. In cases where the entity sizes are not specified, default values can be applied to avoid targeting an audience that is either too narrow or too broad to be useful. Multiple default ranges may be specified in order of usefulness. The total entity size (e.g., the aggregate entities) is calculated by adding the number of entities not containing the value for the target feature for each leaf that falls within the minimum threshold quantity 52 and the maximum threshold quantity 54.

Minimum threshold quantity 52 and maximum threshold quantity 54—The leaf nodes of interest are not the leaf nodes that fully match the target feature. The leaf nodes of interest are in the range defined by the minimum threshold quantity 52 and maximum threshold quantity 54 where the total audience size is between minimum and maximum audience sizes. The minimum threshold quantity 52 and the maximum threshold quantity 54 define a window that is applied to each leaf node in the tree and indicates whether the leaf node should be considered part of the target audience.

Number CCP Alpha Adjustment Attempts—The maximum number of times the CCP Alpha parameter may be adjusted in the search for a good tree.

Number of Leaf Adjustment Attempts—The number of times that the minimum and maximum target threshold values may be adjusted in order to find a good tree.

Number of Estimators—The maximum number of estimators used by the Ada Boost meta-algorithm.

Sample Size—The size of the subset of the total entities used for training and testing the model. This value should be large enough to provide meaningful results, but small enough to provide acceptable performance for the user. In cases where the response time to the user is not critical, as much data from the original dataset should be used.

Targeted Feature—This is the feature that the user 44 wants to target. The target feature should contain a desired value. A goal is to identify entities that lack the target feature and potentially cause such entities to have the target feature via, in this example, communications that offer the entities the target feature.

Tree Maximum Depth—The maximum depth of the decision tree. This value should be tuned to provide meaningful decision trees. In most cases, a value between 3 and 6 (inclusive) can be used.

The user 44 also sets a target feature 56 that identifies the particular feature 22 that the decision trees 28 are to be trained to predict. After setting any other suitable or desirable hyperparameters, the user 44 communicates with the controller 20 to generate decision trees 28 until one or more suitable decision trees 28 are identified. The controller 20, based on the feature metadata 24, selects a set of trainable features 22. The set of trainable features 22 may comprise those features 22 indicated by the trainable feature field 34 of the corresponding metadata entry 30 as being a trainable feature. The controller 20 may then select, from the set of trainable features 22, a subset of trainable features 22. In this example, the controller 20 first selects a subset 58-1 that includes trainable features 22-3, 22-5, 22-16, 22-17, and 22-19. The controller 20 generates a trained decision tree 28-1 using the values of the trainable features 22-3, 22-5, 22-16, 22-17, and 22-19 contained in the training dataset 26 and the target feature 56. For purposes of illustration, it will be assumed that the decision tree 28-1 is not a suitable decision tree. Suitability of a decision tree will be described in greater detail with regard to the decision tree 28-N.

The controller 20 then repeats the process for the decision tree 28-2. The controller may pick a different set of features 22 based on, for example, cardinality and/or coverage of the features 22 as indicated by the corresponding metadata entries 30. An underfitted decision tree is where an aggregate quantity of entities exceeds the maximum target audience quantity 50. For an underfitted decision tree the controller 20 may do one or more of the following:
  A) The tree maximum depth hyperparameter may be increased by one and a new decision tree will be generated. The controller 20 may repeat this process until a satisfactory decision tree has been found, or until ½ the original tree depth adjustment has been attempted.
  B) The controller 20 may adjust the minimum threshold quantity 52 and the maximum threshold quantity 54 by tightening the window by the leaf window adjustment value. This may be done a maximum of the number of leaf adjustment attempt times. This may be implemented against all previously created decision trees.
  C) If set, the controller 20 may decrease the CCP Alpha value by the CCP Alpha adjustment value. This may be done until maximum CCP Alpha adjustment attempts values have been tried. This may be implemented against all previously created decision trees.
  D) If no sufficient decision tree has been found, or if the decision trees are near the edges of the window defined by the minimum threshold quantity 52 and the maximum threshold quantity 54, the Ada boost meta-classifier based on the closest fitting decision tree from the previous three techniques may be used to find better fitting decision trees.

The number of estimators for AdaBoost can be controlled by the number of estimators hyperparameter. After running the meta-classifier, all generated decision trees may be examined to see if any trees fit within the minimum target audience quantity 48 and the maximum target audience quantity 50. If multiple acceptable decision trees are found, the decision tree closest to the center of the minimum target audience quantity 48 and the maximum target audience quantity 50 window may be used.

An overfitted decision tree is where an aggregate quantity of entities is less than the minimum target audience quantity 48. For an overfitted decision tree the controller 20 may do one or more of the following:
  A) The decision tree maximum depth may be decreased by one and the decision tree may be regenerated. This process may be attempted until a satisfactory decision tree has been found, or ½ the original tree depth value tries have been attempted.
  B) The controller 20 may adjust the minimum threshold quantity 52 and the maximum threshold quantity 54 by loosening the window by the leaf window adjustment value. This will be done a maximum of number of leaf window adjustment attempt times. This may be implemented against all previously created decision trees.
  C) If set, the CCP Alpha value may be increased by CCP Alpha adjustment value. This may be done until maximum CCP Alpha adjustment attempts values have been tried. This may be implemented against all previously created decision trees.
  D) If no sufficient decision tree has been found, or if the decision trees are near the edges of the window defined by the minimum threshold quantity 52 and the maximum threshold quantity 54, the Ada boost meta-classifier based on the closest fitting decision tree from the previous three techniques may be used to find better fitting decision trees.

In this example, the controller 20 selects a subset 58-2 that includes trainable features 22-1, 22-3, 22-4 and 22-5. The controller 20 generates a trained decision tree 28-2 using the values of the trainable features 22-1, 22-3, 22-4 and 22-5 contained in the training dataset 26 and the target feature 56. For purposes of illustration, it will be assumed that the decision tree 28-2 is not a suitable decision tree.

For the decision tree 28-N, the controller 20 first selects a subset 58-N that includes the trainable features 22-1, 22-2, and 22-3. The controller 20 generates a trained decision tree 28-N using the values of the trainable features 22-1, 22-2, and 22-3 contained in the training dataset 26. For purposes of illustration, it will be assumed that the feature 22-1 is an "interests" feature, the feature 22-2 is an income level feature and the feature 22-3 is an education level feature. It will be assumed the target feature 56 is flooring, and the value is "wood flooring". Thus, the user 44 is interested in generating decision trees that attempt to predict those subscribers that have wood flooring. The feature 22-1 corresponds to the data field 42-1 in the training dataset 26, the feature 22-2 corresponds to the data field 42-2 in the training dataset 26, and the feature 22-3 corresponds to the data field 42-3 in the training dataset 26.

Figure 2:
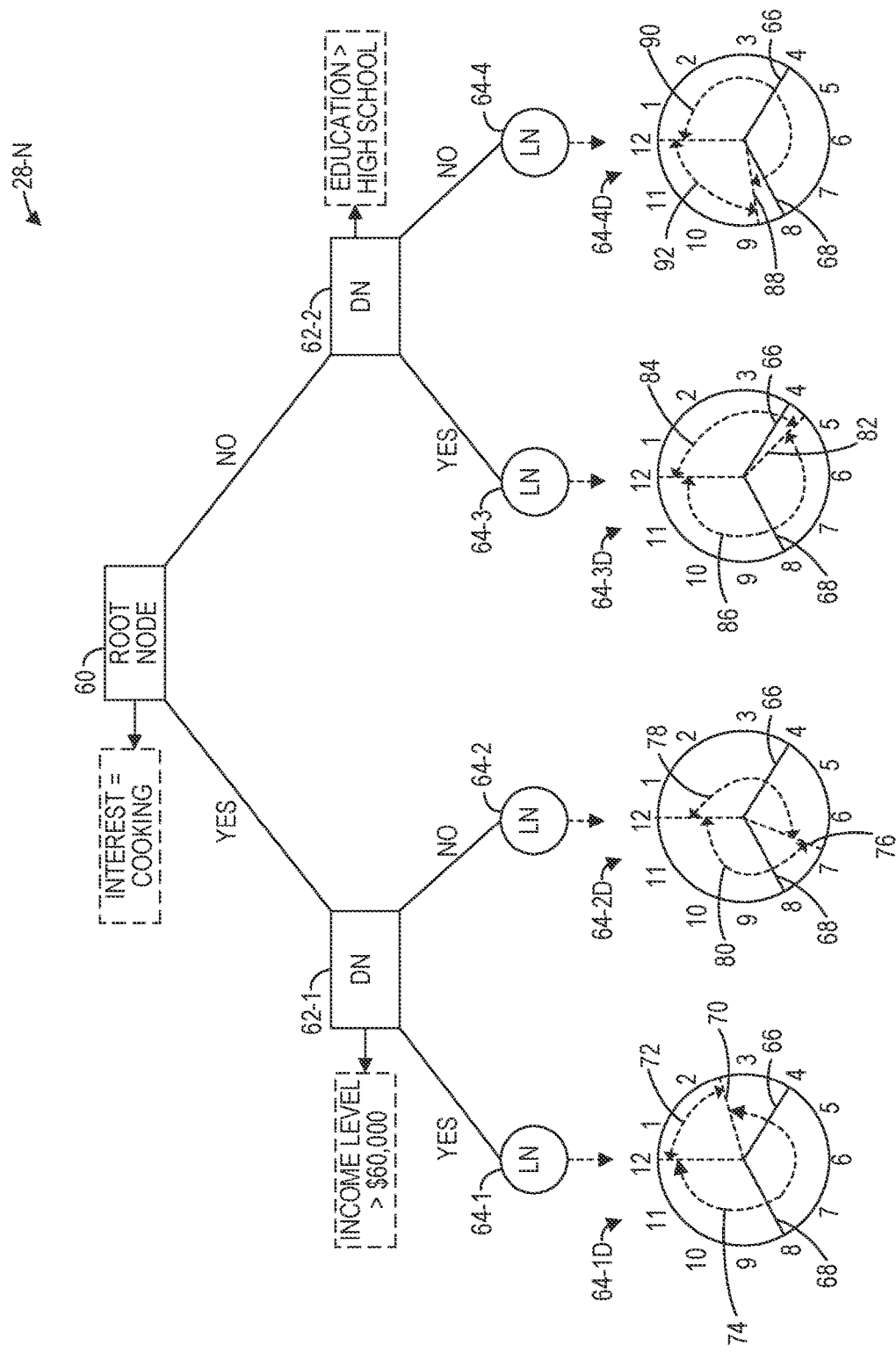
FIG. 2 illustrates a decision tree according to some implementations.

Due to spatial limitations of FIG. 1, a more detailed view of the trained decision tree 28-N is illustrated in FIG. 2. The trained decision tree 28-N, in this example, includes a root node 60, two decision nodes 62-1 and 62-2, and four leaf nodes 64-1-64-4. The root node 60 corresponds to the feature 22-1, the decision node 62-1 corresponds to the feature 22-2, and the decision node 62-2 corresponds to feature 22-3. The root node 60 also corresponds to a condition that includes a conditional operator and a value, and that causes a split in the entries 40 of the training dataset 26, such that a subset of entries 40 that meet the condition will be associated with the decision node 62-1 and a subset of entries 40 that do not meet the condition will be associated with the decision node 62-2. In this example, the conditional operator is an equals operator and the value is cooking (e.g., "interests=cooking"). The entries 40 that have a data field 42-1 that indicates an interest in cooking are associated with the decision node 62-1, and the entries 40 that have a data field 42-1 that do not indicate an interest in cooking are associated with the decision node 62-2.

The decision node 62-1 corresponds to a condition that includes a conditional operator and a value, and that causes a split in the entries 40 of the training dataset 26, such that a subset of entries 40 that meet the condition will be associated with the leaf node 64-1 and a subset of entries 40 that do not meet the condition will be associated with the leaf node 64-2. In this example, the conditional operator is a greater than sign and the value is 60,000 (e.g., "income level>60,000"). The entries 40 that have a data field 42-2 that indicates an income level less than or equal to 60,000 are associated with the leaf node 64-2, and the entries 40 that have a data field 42-2 that indicates an income level greater than 60,000 are associated with the leaf node 64-1.

The decision node 62-2 corresponds to a condition that includes a conditional operator and a value, and that causes a split in the entries 40 of the training dataset 26, such that a subset of entries 40 that meet the condition will be associated with the leaf node 64-3 and a subset of entries 40 that do not meet the condition will be associated with the leaf node 64-4. In this example, the conditional operator is a greater than sign and the value is high school level education (e.g., "education level>high school"). The entries 40 that have a data field 42-3 that indicates an education level greater than high school are associated with the leaf node 64-3, and the entries 40 that have a data field 42-3 that indicates an education level less than or equal to high school are associated with the leaf node 64-4.

The controller 20 may now determine for each leaf node 64 the actual or estimated quantity of subscribers of the service provider that have or do not have the targeted feature. The controller 20 may generate a query for each leaf node 64 by traversing the path from the root node 60 to the leaf node 64 and assembling a query. As an example for the leaf node 64-1, the controller 20 accesses the root node 60 and, based on the feature 22-1, and the condition and the value that corresponds to the root node 60, generates a query segment "return entities where (interest=cooking)". It is noted that the query described herein is a pseudocode and that the actual query generated by the controller 20 will comply with the syntax rules of a particular query language used by the service provider.

The controller 20 next accesses the decision node 62-1 and, based on the feature 22-2, and the condition and the value that corresponds to the decision node 62-1, generates a query segment "AND (income level greater than 60000)". The controller 20 appends the query segment to the previous query segment to derive the query "return entities where (interest=cooking) AND (income level greater than 60000)".

The controller 20 can query a subscriber database of the service provider to determine the quantity (e.g., number) of subscribers that match this query. In this example, it will be assumed that the results of the query indicate that 12,000 subscribers meet this criteria. The controller 20 then determines that of the 12,000 subscribers, 9500 do not have wood flooring and 2500 do have wood flooring. As an alternative to querying the subscriber database, the controller 20 can query the training dataset 26 and extrapolate the results to the size of the subscriber database.

FIG. 2 includes for purposes of explanation a diagram 64-1D that corresponds to the leaf node 64-1. The complete area of the diagram 64-1D represents the total quantity of 12,000 subscribers. A line 66 indicates the minimum threshold quantity 52 of 4000 on the diagram 64-1D, and a line 68 indicates the maximum threshold quantity 54 of 8000. A dashed line 70 represents the location of the split of the 2500 subscribers who do have wood flooring (represented by an arc 72) and the 9500 who do not have wood flooring (represented by an arc 74). Because the location of the split does not occur within the minimum threshold quantity 52 and the maximum threshold quantity 54 of 8000, the leaf node 64-1 is ignored.

The controller 20 performs the same process for each of the leaf nodes 64-2-64-4. Solely for simplicity it will be assumed that each of the generated queries also returned 12,000 subscribers, which in practice, would be highly unlikely. The diagram 64-2D corresponds to the leaf node 64-2, and the controller 20 determined that of the 12,000 subscribers returned by the query corresponding to the leaf node 64-2, 6500 subscribers do have wood flooring and 5500 subscribers do not have wood flooring. Again, the line 66 indicates the minimum threshold quantity 52 of 4000, and the line 68 indicates the maximum threshold quantity 54 of 8000. A dashed line 76 represents the location of the split of the 6500 subscribers who do have wood flooring (represented by an arc 78) and 5500 subscribers who do not have wood flooring (represented by an arc 80). Because the location of the split does occur within the minimum threshold quantity 52 and the maximum threshold quantity 54 of 8000, the leaf node 64-2 is selected.

The diagram 64-3D corresponds to the leaf node 64-3, and the controller 20 determined that of the 12,000 subscribers returned by the query corresponding to the leaf node 64-3, 4500 subscribers do have wood flooring and 7500 subscribers do not have wood flooring. Again, the line 66 indicates the minimum threshold quantity 52 of 4000, and the line 68 indicates the maximum threshold quantity 54 of 8000. A dashed line 82 represents the location of the split of the 4500 subscribers who do have wood flooring (represented by an arc 84) and 7500 subscribers who do not have wood flooring (represented by an arc 86). Because the location of the split does occur within the minimum threshold quantity 52 and the maximum threshold quantity 54 of 8000, the leaf node 64-3 is selected.

The diagram 64-4D corresponds to the leaf node 64-4, and the controller 20 determined that of the 12,000 subscribers returned by the query corresponding to the leaf node 64-4, 8800 subscribers do have wood flooring and 3200 subscribers do not have wood flooring. Again, the line 66 indicates the minimum threshold quantity 52 of 4000, and the line 68 indicates the maximum threshold quantity 54 of 8000. A dashed line 88 represents the location of the split of the 8800 subscribers who do have wood flooring (represented by an arc 90) and 3200 subscribers who do not have wood flooring (represented by an arc 92). Because the location of the split does not occur within the minimum threshold quantity 52 and the maximum threshold quantity 54 of 8000, the leaf node 64-4 is ignored.

The controller 20 accesses the subset of selected leaf nodes 64-2 and 64-3, and aggregates the quantity of subscribers who do not have the targeted feature. In this example, the controller 20 sums the values of 5500 and 7500 to determine an aggregate quantity of entities of 13,000. The controller 20 determines that the aggregate quantity of entities of 13,000 is in between the minimum target audience quantity 48 of 10,000 and the maximum target audience quantity 50 of 15,000, and thus the decision tree 28-N is a suitable decision tree. In response, the controller 20 may halt the training process.

The controller 20 may then generate a query based on the paths from the root node 60 to each of the leaf nodes 64-2 and 64-3. In some implementations, the controller 20 may recursively traverse each path from the root node 60 to each leaf node 64-1-64-4. Upon reaching the leaf nodes 64-1 and 64-4 the controller 20 determines that the leaf nodes 64-1 and 64-4 are a leaf nodes to be ignored, and the recursive function returns no query segments. For the leaf nodes 64-2 and 64-3, the controller 20 first accesses the root node 60 and, based on the feature 22-1, and the condition and the value that corresponds to the root node 60, generates a query segment "return entities where (interest=cooking)". The controller 20 next accesses the decision node 62-1 and, based on the feature 22-2, and the condition and the value that corresponds to the decision node 62-1, generates a query segment "AND (income level not greater than 60000)". The controller 20 appends the query segment to the previous query segment to derive the query "return entities where (interest=cooking) AND (income level not greater than 60000)". The controller 20 next accesses the decision node 62-2 and, based on the feature 22-3, and the condition and the value that corresponds to the decision node 62-2, generates a query segment "AND (education level greater than high school)". The controller 20 appends the query segment to the previous query segment to derive a query "return entities where (interest=cooking) AND (income level not greater than 60000) AND "(education level greater than high school)". Because the user 44 is interested in those entities (i.e., subscribers in this example) who do not have wood flooring, the controller 20 may modify the query to include a condition that omits any entity that has the target feature 56 by appending the query segment "AND (flooring not equal to wood flooring)" to generate the query "return entities where (interest=cooking) AND (income level not greater than 60000) AND "(education level greater than high school) AND (flooring not equal to wood flooring)".

Referring to FIG. 1 again, the controller 20 may store the generated query in a query database 94. The controller 20 may store the generated decision tree 28-N in a decision tree database 96. The controller 20 may also query the subscriber database using the query, to obtain, from the database, information that identifies a subset of the plurality of entries that match the query.

Figure 3:
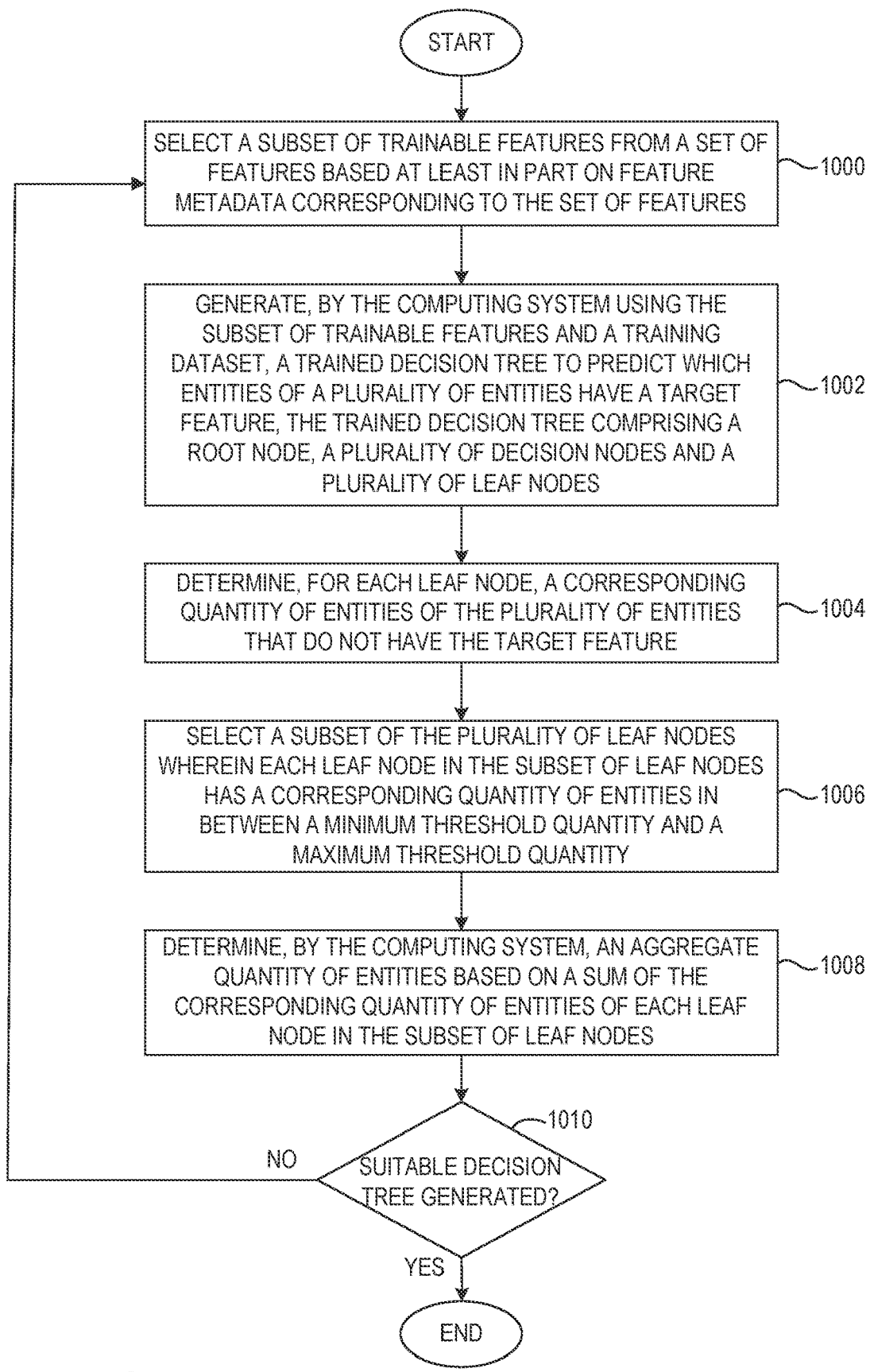
FIG. 3 is a flowchart of a method for generating a detuned decision tree for entity selection according to some implementations.

FIG. 3 is as flowchart of a method for generating a detuned decision tree for entity selection according to some implementations. FIG. 3 will be discussed in conjunction with FIGS. 1 and 2. The computing system 12 generates one or more trained decision trees. The computing system 12 may stop generating trained decision trees upon generating a suitable trained decision tree, or may continue to generate a plurality of suitable trained decision trees. The computing system 12 selects a subset of trainable features 22 from the set of features 22 based at least in part on the feature metadata 24 corresponding to the set of features 22 (FIG. 3, block 1000). The computing system 12 generates, using the subset of trainable features 22 and the training dataset 26, the trained decision tree 28-1 to predict which entities of a plurality of entities have the target feature 56, the trained decision tree 28-1 comprising the root node 60, the plurality of decision nodes 62 and the plurality of leaf nodes 64 (FIG. 3, block 1002). The computing system 12 determines, for each leaf node 64, a corresponding quantity of entities of the plurality of entities that do not have the target feature 56 (FIG. 3, block 1004). The computing system 12 selects a subset of the plurality of leaf nodes 64 wherein each leaf node 64 in the subset of leaf nodes 64 has a corresponding quantity of entities in between the minimum threshold quantity 52 and the maximum threshold quantity 54 (FIG. 3, block 1006). The computing system 12 determines the aggregate quantity of entities based on a sum of the corresponding quantity of entities of each leaf node 64 in the subset of leaf nodes 64 (FIG. 3, block 1008). The computing system 12 determines whether the trained decision tree 28-1 is a suitable trained decision tree, wherein a trained decision tree is a suitable trained decision tree where the aggregate quantity of entities of the trained decision tree is between the minimum target audience quantity 48 and the maximum target audience quantity 50 (FIG. 3, block 1010). If not, the controller 12 may return to block 1000 to select different features 22 and repeat the process until a suitable trained decision tree is generated.

Figure 4:
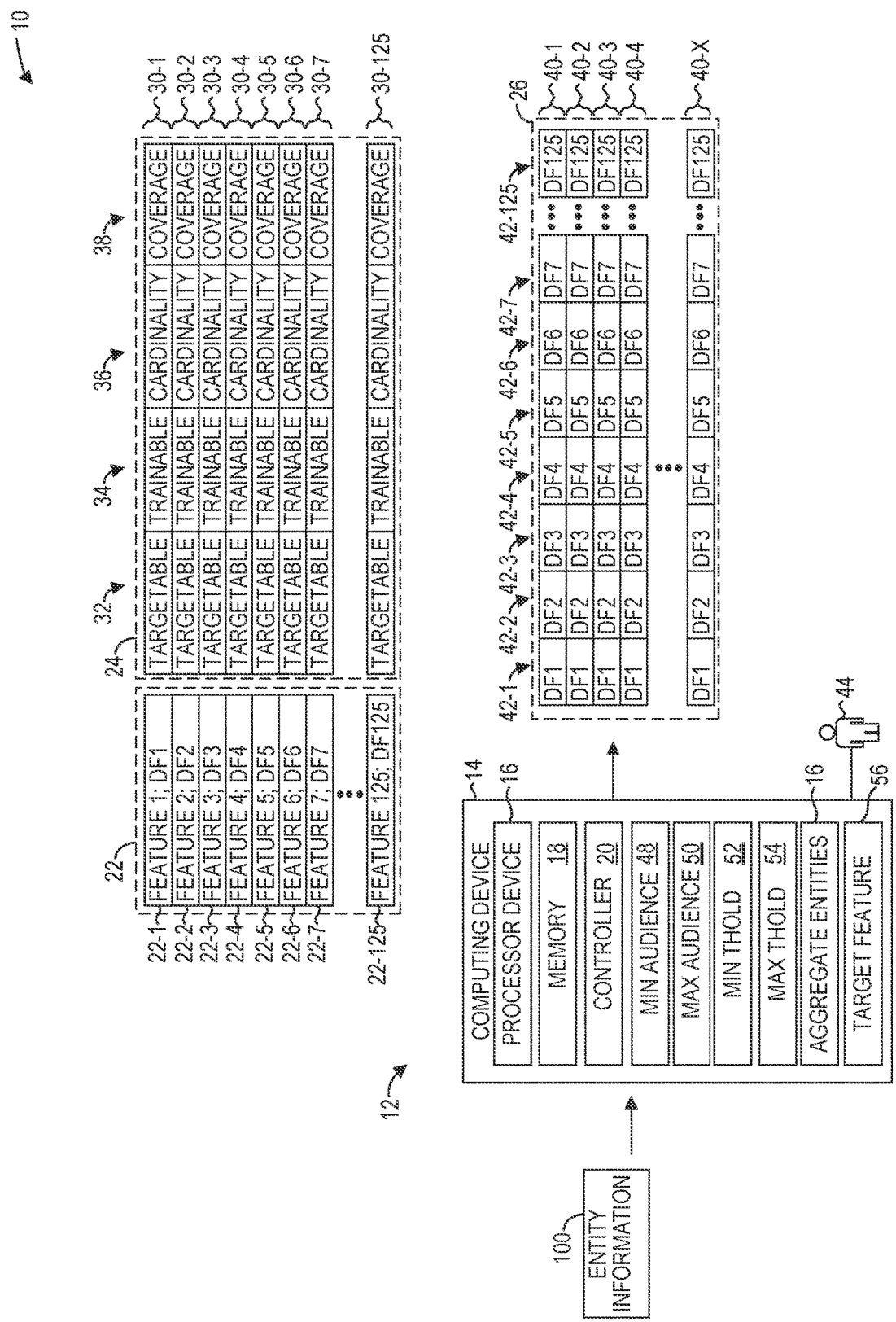
FIG. 4 is a block diagram of the environment illustrated in FIG. 1 suitable for generating a training dataset according to some implementations.

FIG. 4 is a block diagram of the environment 10 suitable for generating the training dataset 26, and/or updating the training dataset 26 over time as existing subscribers of the service provider stop subscribing and new subscribers begin subscribing.

Initially, entity information 100 is obtained. The entity information 100 may be obtained in any suitable manner, such as based on information provided by subscribers, or via purchase from companies that specialize in providing known information about individuals. The entity information 100 may include information about all the subscribers of the service provider or information about a subset of the subscribers. An operator may define the features 22 identified in the entity information 100, including the locations of the data fields in the entity information 100 where the features 22 are located, and also define a desired format for the data fields 42 in the training dataset 26 to identify which features 22 correspond to which data fields 42.

The computing system 12 may then process the entity information 100 to generate the entries 40, wherein each entry 40 corresponds to a subscriber identified in the entity information 100. The computing system 12 may identify sensitive information in the entity information 100 and either ignore the data, or, may set the targetable feature field 32 and trainable feature field 34 of the metadata entry 30 that corresponds to the sensitive information to a value of false so that the sensitive information cannot be used as either a training feature or a target feature.

The computing system 12 may then process the values in each of the data fields 42 to determine the value of the cardinality field 36 and feature coverage field 38 of the metadata entry 30 that corresponds to the data fields 42. Subsequently, the computing system 12 may periodically or intermittently, such as every day or every week, process additional entity information that identifies subscribers who no longer subscribe to the service provider and that provides information for new subscribers. The computing system 12 may remove the subscribers who have left from the training dataset 26, add new subscribers to the training dataset 26, and recalculate the value of the cardinality field 36 and feature coverage field 38 for each of the data fields 42.

Figure 5:
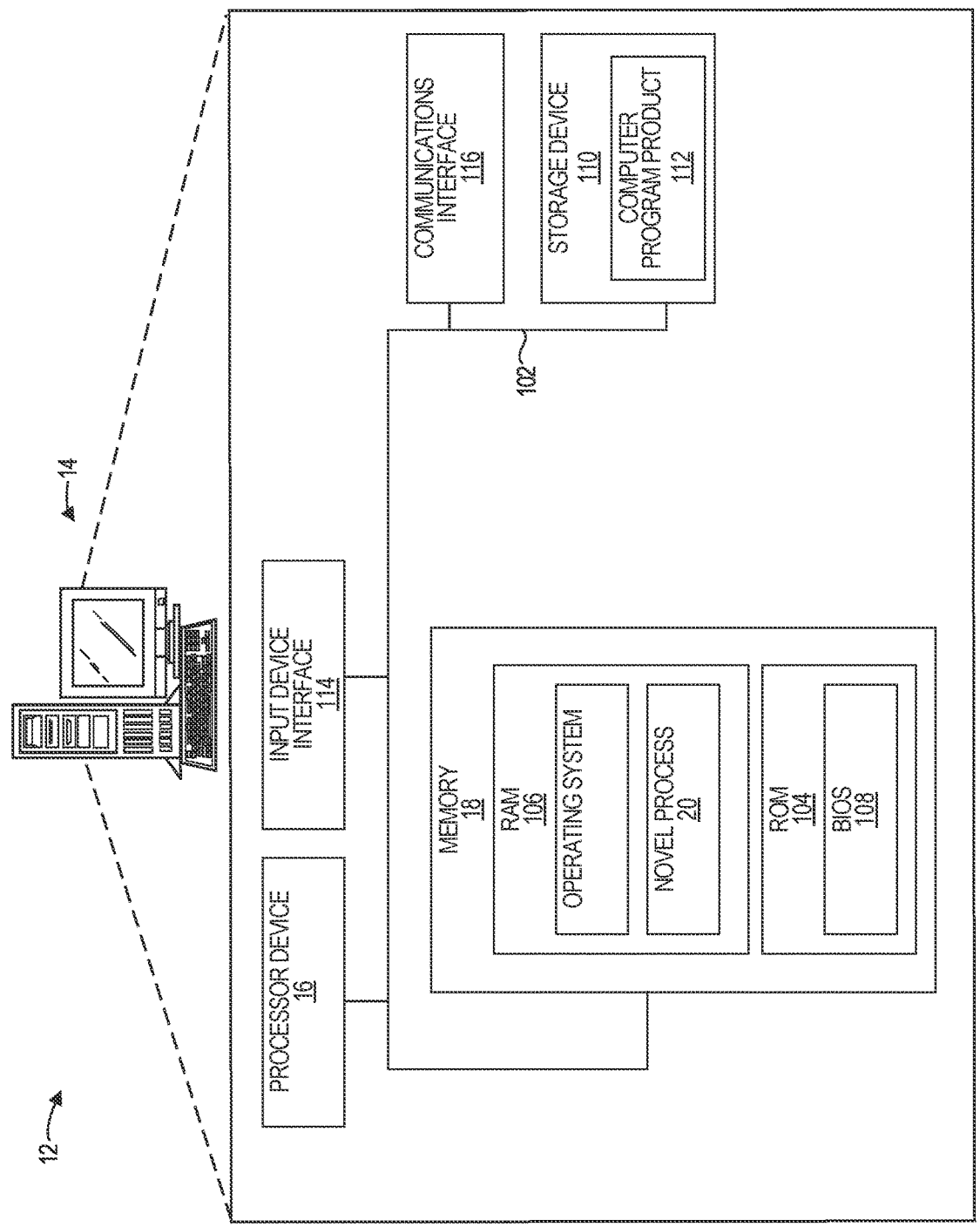
FIG. 5 is a block diagram of a computing device of a computing system suitable for implementing examples according to one example.

FIG. 5 is a block diagram of a computing device 14 of the computing system 12 suitable for implementing examples according to one example. The computing device 14 may comprise any computing or electronic device capable of including firmware, hardware, and/or executing software instructions to implement the functionality described herein, such as a computer server, a desktop computing device, or the like. The computing device 14 includes the processor device 16, the system memory 18, and a system bus 102. The system bus 102 provides an interface for system components including, but not limited to, the system memory 18 and the processor device 16. The processor device 16 can be any commercially available or proprietary processor.

The system bus 102 may be any of several types of bus structures that may further interconnect to a memory bus (with or without a memory controller), a peripheral bus, and/or a local bus using any of a variety of commercially available bus architectures. The system memory 18 may include non-volatile memory 104 (e.g., read-only memory (ROM), erasable programmable read-only memory (EPROM), electrically erasable programmable read-only memory (EEPROM), etc.), and volatile memory 106 (e.g., random-access memory (RAM)). A basic input/output system (BIOS) 108 may be stored in the non-volatile memory 104 and can include the basic routines that help to transfer information between elements within the computing device 14. The volatile memory 106 may also include a high-speed RAM, such as static RAM, for caching data.

The computing device 14 may further include or be coupled to a non-transitory computer-readable storage medium such as a storage device 110, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 110 and other drives associated with computer-readable media and computer-usable media may provide non-volatile storage of data, data structures, computer-executable instructions, and the like.

A number of modules can be stored in the storage device 110 and in the volatile memory 106, including an operating system and one or more program modules, such as the controller 20, which may implement the functionality described herein in whole or in part. All or a portion of the examples may be implemented as a computer program product 112 stored on a transitory or non-transitory computer-usable or computer-readable storage medium, such as the storage device 110, which includes complex programming instructions, such as complex computer-readable program code, to cause the processor device 16 to carry out the steps described herein. Thus, the computer-readable program code can comprise software instructions for implementing the functionality of the examples described herein when executed on the processor device 16. The processor device 16, in conjunction with the controller 20 in the volatile memory 106, may serve as a controller, or control system, for the computing device 14 that is to implement the functionality described herein.

An operator, such as the user 44, may also be able to enter one or more configuration commands through a keyboard (not illustrated), a pointing device such as a mouse (not illustrated), or a touch-sensitive surface such as a display device. Such input devices may be connected to the processor device 16 through an input device interface 114 that is coupled to the system bus 102 but can be connected by other interfaces such as a parallel port, an Institute of Electrical and Electronic Engineers (IEEE) 1394 serial port, a Universal Serial Bus (USB) port, an IR interface, and the like. The computing device 14 may also include a communications interface 116 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method, comprising:
   selecting, by a computing system comprising one or more computing devices, a subset of trainable features from a set of features based at least in part on feature metadata corresponding to the set of features;
   generating, by the computing system using the subset of trainable features and a training dataset, a trained decision tree to predict whether an entity of a plurality of entities has a target feature;
   determining, for each leaf node of a plurality of leaf nodes of the trained decision tree, a corresponding quantity of entities of the plurality of entities that do not have the target feature;
   selecting a subset of leaf nodes from the plurality of leaf nodes wherein each leaf node in the subset of leaf nodes has a corresponding quantity of entities in between a minimum threshold quantity and a maximum threshold quantity, wherein each entity in the corresponding quantity of entities of the subset of leaf nodes is predicted by the trained decision tree to lack the target feature;
   determining, by the computing system, an aggregate quantity of entities based on a sum of the corresponding quantity of entities of each leaf node in the subset of leaf nodes;
   determining, by the computing system, that the trained decision tree is a suitable trained decision tree based on the aggregate quantity of entities of the trained decision tree being between a minimum target audience quantity and a maximum target audience quantity; and
   generating, by the computing system, a query complying with a query syntax that identifies each entity of the aggregate quantity of entities, wherein generating the query comprises:
      accessing, by the computing system, the suitable trained decision tree; and
      traversing, by the computing system, a path between a root node of the suitable trained decision tree and a leaf node of the subset of leaf nodes.

2. The method of claim 1, wherein the trained decision tree comprises a plurality of decision nodes, and wherein each decision node corresponds to a trainable feature of the subset of trainable features used to train the suitable trained decision tree, a condition and a value, and wherein generating the query further comprises:
   generating, by the computing system, the query complying with the query syntax based on the condition and the value corresponding to each decision node in the path.

3. The method of claim 2, further comprising:
   modifying the query to include a condition that omits any entity that has the target feature.

4. The method of claim 3, further comprising:
   querying a database using the query, the database comprising a plurality of entries that correspond to ones of the plurality of entities; and
   receiving, from the database, information that identifies a subset of the plurality of entries that match the query.

5. The method of claim 1, wherein the training dataset comprises a plurality of entries, each entry corresponding to a real-world entity, each entry comprising a plurality of data fields that correspond to ones of the set of features, and wherein one of the set of features comprises the target feature, and wherein at least some of the entries comprise values in the data fields that correspond to the subset of trainable features used to train the suitable trained decision tree and a value in the data field that corresponds to the target feature.

6. The method of claim 1, wherein the feature metadata comprises a plurality of metadata entries that correspond to ones of the set of features, and wherein each metadata entry comprises a cardinality field that, if not empty, identifies a quantity of or percentage of entities of the training dataset that have a distinct value in a data field that corresponds to the feature to which the metadata entry corresponds.

7. The method of claim 6, further comprising:
accessing, by the computing system, a cardinality condition prior to selecting the subset of trainable features; and
wherein selecting the subset of trainable features from the set of features comprises selecting only trainable features for the subset of trainable features wherein the cardinality fields of the metadata entries that correspond to the trainable features have values that match the cardinality condition.

8. The method of claim 1, wherein the feature metadata comprises a plurality of metadata entries that correspond to ones of the set of features, and wherein each metadata entry comprises a trainable feature field that indicates whether the feature to which the metadata entry corresponds can be selected as a trainable feature.

9. The method of claim 8, wherein selecting the set of features from the set of features comprises selecting only features from the set of features wherein the trainable feature fields of the metadata entries that correspond to the features have values that indicate that the features may be selected as trainable features.

10. The method of claim 1, wherein the feature metadata comprises a plurality of metadata entries that correspond to ones of the set of features, and wherein each metadata entry comprises a feature coverage field that identifies a quantity of or percentage of entities of the training dataset that have a value in a data field that corresponds to the feature to which the metadata entry corresponds.

11. The method of claim 10, further comprising:
accessing, by the computing system, a feature coverage condition prior to selecting the subset of trainable features; and
wherein selecting the subset of trainable features from the set of features comprises selecting only trainable features for the subset of trainable features wherein the feature coverage fields of the metadata entries that correspond to the trainable features have values that match the feature coverage condition.

12. The method of claim 1, wherein the feature metadata comprises a plurality of metadata entries that correspond to ones of the set of features, and wherein each metadata entry comprises a targetable feature field that indicates whether the feature to which the metadata entry corresponds can be selected as a targetable feature.

13. The method of claim 1, further comprising:
prior to generating the suitable trained decision tree, generating an unsuitable trained decision tree wherein the unsuitable trained decision tree has an aggregate quantity of entities fewer than the minimum target audience quantity; and
in response to generating to the unsuitable trained decision tree having the aggregate quantity of entities fewer than the minimum target audience quantity, altering one or both of the minimum threshold quantity and the maximum threshold quantity.

14. The method of claim 1, wherein determining, for each leaf node, the corresponding quantity of entities of the plurality of entities that do not have the target feature comprises:
generating, by the computing system, a query based on a path from a root node through one or more decision nodes to a first leaf node of the plurality of leaf nodes, the query including target features that correspond to the root node and each decision node of the one or more decision nodes; and
querying a dataset using the query to determine the corresponding quantity of entities of the plurality of entities that do not have the target feature for the first leaf node.

15. A computing system comprising:
one or more computing devices operable to:
select a subset of trainable features from a set of features based at least in part on feature metadata corresponding to the set of features;
generate, using the subset of trainable features and a training dataset, a trained decision tree to predict whether an entity of a plurality of entities has a target feature;
determine, for each leaf node of a plurality of leaf nodes of the trained decision tree, a corresponding quantity of entities of the plurality of entities that do not have the target feature;
select a subset of leaf nodes from the plurality of leaf nodes wherein each leaf node in the subset of leaf nodes has a corresponding quantity of entities in between a minimum threshold quantity and a maximum threshold quantity, wherein each entity in the corresponding quantity of entities of the subset of leaf nodes is predicted by the trained decision tree to lack the target feature;
determine an aggregate quantity of entities based on a sum of the corresponding quantity of entities of each leaf node in the subset of leaf nodes;
determine that the trained decision tree is a suitable trained decision tree based on the aggregate quantity of entities of the trained decision tree being between a minimum target audience quantity and a maximum target audience quantity; and
generate a query complying with a query syntax that identifies each entity of the aggregate quantity of entities, wherein generating the query comprises:
accessing the suitable trained decision tree; and
traversing a path between a root node of the suitable trained decision tree and a leaf node of the subset of leaf nodes.

16. The computing system of claim 15, wherein the trained decision tree comprises a plurality of decision nodes, and wherein each decision node corresponds to a trainable feature of the subset of trainable features used to train the suitable trained decision tree, a condition and a value, and wherein generating the query further comprises:
generating the query complying with the query syntax based on the condition and the value corresponding to each decision node in the path.

17. The computing system of claim 15, wherein the one or more computing devices are further operable to modify the query to include a condition that omits any entity that has the target feature.

18. A non-transitory computer-readable storage medium that includes executable instructions operable to cause one or more computing devices to:
- select a subset of trainable features from a set of features based at least in part on feature metadata corresponding to the set of features;
- generate, using the subset of trainable features and a training dataset, a trained decision tree to predict whether an entity of a plurality of entities has a target feature;
- determine, for each leaf node of a plurality of leaf nodes of the trained decision tree, a corresponding quantity of entities of the plurality of entities that do not have the target feature;
- select a subset of leaf nodes from the plurality of leaf nodes wherein each leaf node in the subset of leaf nodes has a corresponding quantity of entities in between a minimum threshold quantity and a maximum threshold quantity, wherein each entity in the corresponding quantity of entities of the subset of leaf nodes is predicted by the trained decision tree to lack the target feature;
- determine an aggregate quantity of entities based on a sum of the corresponding quantity of entities of each leaf node in the subset of leaf nodes;
- determine that the trained decision tree is a suitable trained decision tree based on the aggregate quantity of entities of the trained decision tree being between a minimum target audience quantity and a maximum target audience quantity; and
- generate a query complying with a query syntax that identifies each entity of the aggregate quantity of entities, wherein generating the query comprises:
  - accessing the suitable trained decision tree; and
  - traversing a path between a root node of the suitable trained decision tree and a leaf node of the subset of leaf nodes.

19. The non-transitory computer-readable storage medium of claim 18, wherein the trained decision tree comprises a plurality of decision nodes, and wherein each decision node corresponds to a trainable feature of the subset of trainable features used to train the suitable trained decision tree, a condition and a value, and wherein generating the query further comprises:
- generating the query complying with the query syntax based on the condition and the value corresponding to each decision node in the path.

20. The non-transitory computer-readable storage medium of claim 18, wherein the instructions are further operable to cause the one or more computing devices to modify the query to include a condition that omits any entity that has the target feature.

* * * * *